United States Patent
Herrero

(10) Patent No.: US 9,692,709 B2
(45) Date of Patent: Jun. 27, 2017

(54) PLAYOUT BUFFERING OF ENCAPSULATED MEDIA

(71) Applicant: Oracle International Corporation, Redwood Shores, CA (US)

(72) Inventor: Rolando Herrero, Derry, NH (US)

(*) Notice: Subject to any disclaimer, the term of this patent is extended or adjusted under 35 U.S.C. 154(b) by 166 days.

(21) Appl. No.: 14/730,490

(22) Filed: Jun. 4, 2015

(65) Prior Publication Data

US 2016/0359765 A1 Dec. 8, 2016

(51) Int. Cl.
| | |
|---|---|
| G06F 15/16 | (2006.01) |
| H04L 12/925 | (2013.01) |
| H04L 12/46 | (2006.01) |
| H04L 29/06 | (2006.01) |
| H04L 12/853 | (2013.01) |

(52) U.S. Cl.
CPC ........ *H04L 47/722* (2013.01); *H04L 12/4633* (2013.01); *H04L 47/2416* (2013.01); *H04L 65/60* (2013.01)

(58) Field of Classification Search
CPC ...................................................... H04L 65/60
USPC ........................................................ 709/219
See application file for complete search history.

(56) References Cited

U.S. PATENT DOCUMENTS

| | | | |
|---|---|---|---|
| 6,766,376 B2 | 7/2004 | Price | |
| 7,796,999 B1 | 9/2010 | Martin et al. | |
| 7,873,727 B2 | 1/2011 | Pal et al. | |
| 8,094,556 B2 | 1/2012 | Michaelis et al. | |
| 8,218,439 B2 | 7/2012 | Deshpande | |
| 2005/0259694 A1 | 11/2005 | Garudadri et al. | |
| 2013/0262691 A1 | 10/2013 | Bulava et al. | |
| 2014/0157405 A1* | 6/2014 | Joll | H04L 63/1425 726/22 |
| 2015/0207834 A1* | 7/2015 | Zhao | H04N 21/631 709/231 |

OTHER PUBLICATIONS

Ivano Bartoli et al., "A synchronization control scheme for videoconferencing services", Journal of Multimedia, vol. 2, No. 4, Aug. 2007, http://ojs.academypublisher.com/index.php/jmm/article/viewFile/02040109/1198/.

Miroslaw Narbutt et al., "Adaptive playout buffering for audio/video transmission over the Internet", Department of Computer Science, University College Dublin, Belfield Dublin 4, Ireland, http://www.csi.ucd.ie/staff/Imurphy/home/mypubs/mirek_UKTS_2001.pdf, May 2001.

(Continued)

*Primary Examiner* — Adnan Mirza
(74) *Attorney, Agent, or Firm* — Miles & Stockbridge P.C.

(57) ABSTRACT

A system is provided that performs playout buffering functionality for encapsulated media. The system receives, by a tunneling client, packets including media data from a tunneling server via a tunnel. The system further selects an inner socket from a plurality of inner sockets. The system further buffers the packets in a playout buffer that corresponds to the selected inner socket. The system further transfers the packets from the playout buffer to a receiving queue that corresponds to the selected inner socket when a number of the packets exceeds a playout buffer threshold. The system further releases the packets from the receiving queue to a client application.

20 Claims, 4 Drawing Sheets

(56) References Cited

OTHER PUBLICATIONS

Syed Hasan et al., "Cross Layer Protocol Support for Live Streaming Media", Department of Computer Science University of Otago, Dunedin, New Zealand, http://www.cs.otago.ac.nz/staffpriv/hzy/papers/aina08.pdf, 2008.

* cited by examiner

PLAYOUT BUFFERING OF ENCAPSULATED MEDIA

FIELD

One embodiment is directed to a communications network, and more particularly, to delivering real-time traffic over a communications network.

BACKGROUND

Many enterprise environments have replaced their Public Switched Telephone Network ("PSTN") telephony services with telephony services that use the Internet Protocol ("IP"), commonly known as Voice over IP ("VoIP") or IP Telephony. Since IP Telephony uses an IP network as its backbone, it can provide advanced features such as video conferencing, call recording, and call forwarding.

Recently, the growing base of mobile data subscribers, the wide availability of Internet access, and the high availability of bandwidth in both fixed and mobile networks has resulted in the popularity of advanced services accessed via the Internet (known as Over-the-Top ("OTT") services). This has caused competitive service providers to offer OTT services and hence face corresponding challenges as they implement these new services.

SUMMARY

One embodiment is a system that performs playout buffering functionality for encapsulated media. The system receives, by a tunneling client, packets including media data from a tunneling server via a tunnel. The system further selects an inner socket from a plurality of inner sockets. The system further buffers the packets in a playout buffer that corresponds to the selected inner socket. The system further transfers the packets from the playout buffer to a receiving queue that corresponds to the selected inner socket when a number of the packets exceeds a playout buffer threshold. The system further releases the packets from the receiving queue to a client application.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

One embodiment provides playout buffering for encapsulated media (e.g., packets containing audio data, video data, etc.) in a tunneling environment. In one embodiment, a tunneling client integrates a playout buffer within an inner socket tunnel scheme, where the playout buffer is inserted at a transport layer right before a queue that interfaces with a client application. Based on a selected buffering depth (also identified as a "playout buffer threshold"), the tunneling client can buffer traffic, such as encapsulated media, before the tunnel client releases the traffic to a client application. This can minimize an exhibited choppiness of the encapsulated media that can be a consequence of network latency and packet loss. Further, the tunneling client can synchronize both speech and video media using corresponding playout buffers that operate in pairs. The synchronization of the speech and video media can allow the tunneling client to deliver improved media quality.

Figure 1:
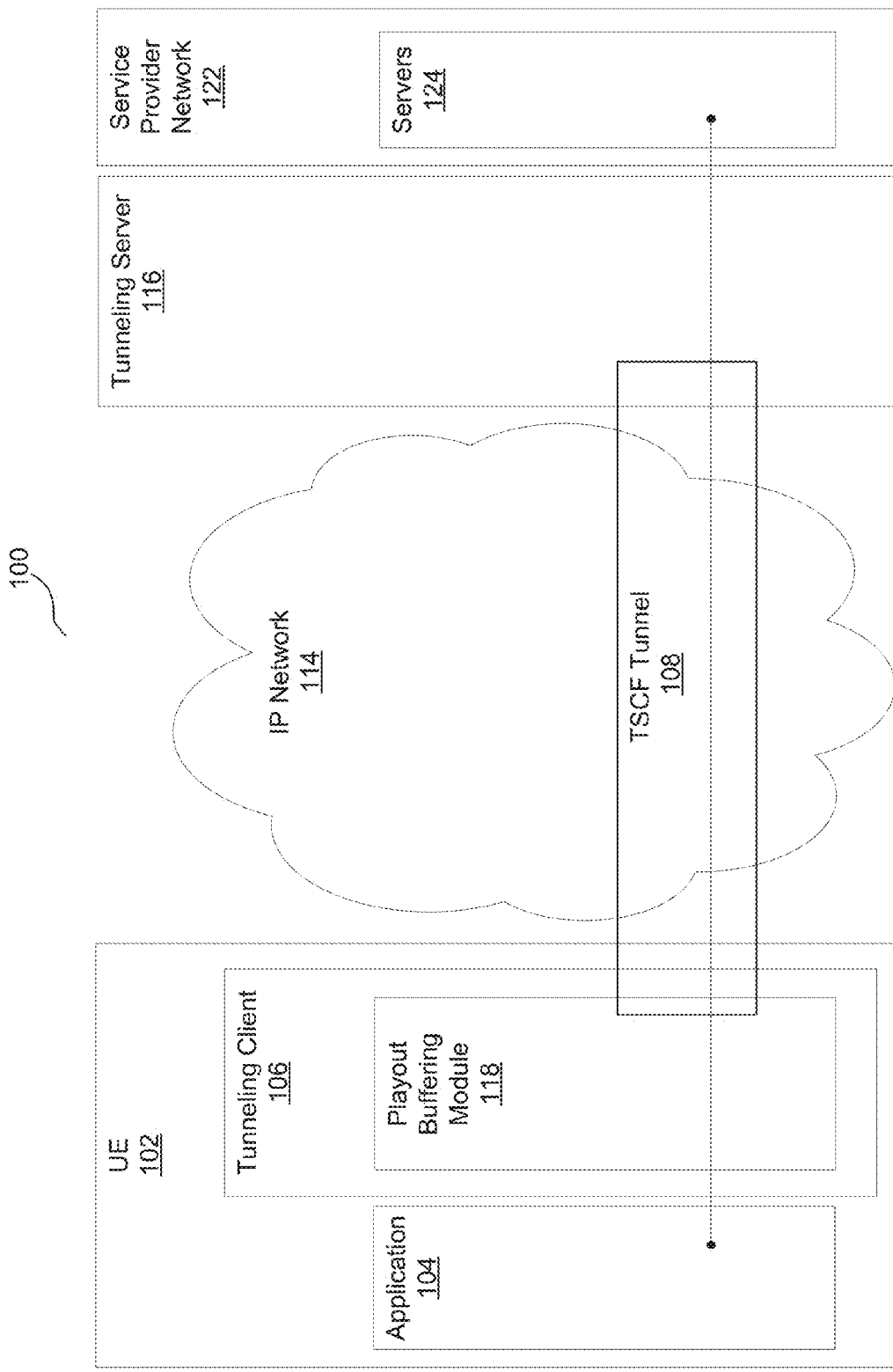
FIG. 1 illustrates an overall diagram of a network including network elements that can implement embodiments of the present invention and/or interact with embodiments of the invention.

FIG. 1 is an overview diagram of a network 100 including network elements that implement embodiments of the present invention and/or interact with embodiments of the invention. Network 100 includes a user equipment ("UE") 102 that performs real-time communications ("RTC") over an Internet Protocol ("IP") network 114 with a service provider network 122. In RTC, users exchange information instantly or with insignificant latency. Example applications for RTC include voice and/or video calls, application streaming, softphones, and remote desktop applications. UE 102 may be any device used by an end-user for communications, such as a smartphone, a laptop computer, a tablet, a television, etc.

In performing RTC, UE 102 communicates signaling and media traffic with respective servers 124 in service provider network 122. Signaling traffic may be communicated according to an application layer protocol such as the Session Initiation Protocol ("SIP"). SIP is configured to be independent of the underlying transport layer. Accordingly, SIP can run on different transport protocols, such as the Transmission Control Protocol ("TCP") as described in, for example, Internet Engineering Task Force ("IETF") request for comments ("RFC") 793 and RFC 675, the User Datagram Protocol ("UDP") as described in, for example, IETF RFC 768, etc.

Network 100 further includes a tunneling server 116 that, together with a tunneling client 106 within UE 102, provides functionality for establishing and managing tunnels for performing RTC according to the Tunneled Services Control Function ("TSCF") standard as described in, for example, 3rd generation partnership program ("3GPP") technical report ("TR") 33.830 V0.5.0, the disclosure of which is hereby incorporated by reference in its entirety. In one embodiment, tunneling client 106 and tunneling server 116 establish a TSCF tunnel 108 that is compliant with TSCF tunnel management (e.g., tunnel initialization, maintenance, termination, etc., as defined by, e.g., 3GPP TR 33.830 V0.5.0), and TSCF tunnel transport protocols are supported for the negotiation of TSCF tunnel 108 between tunneling client 106 and tunneling server 116.

The TSCF standard provides client side and server side network elements for establishing managed tunnels for performing RTC (e.g., tunneling client 106 and tunneling server 116 in FIG. 1). It also provides two types of outer layer tunneling transports: a stream-based outer layer tunneling transport via TCP or Transport Layer Security ("TLS"), and a datagram-based outer layer tunneling transport via UDP or Datagram Transport Layer Security ("DTLS").

TLS is a cryptographic protocol as provided in, for example, IETF RFC 2246, RFC 4346, RFC 5246, and/or RFC 6176. DTLS is a protocol that provides communications privacy for datagram protocols. TCP and TLS provide reliable, ordered and error-checked delivery of the inner layer traffic, but introduce undesirable latency that is detrimental to RTC applications over a communications network that experiences impairments. On the other hand, UDP and DTLS do not guarantee reliable delivery, thus minimizing latency and being desirable for RTC.

In some embodiments, IP network 114 may include security devices (e.g., firewalls, proxies, etc.) that allow traffic of only a certain transport protocol (e.g., only TCP, only UDP, etc.). Accordingly, tunneling client 106 and tunneling server 116 may establish and manage TSCF tunnel 108 such that UE 102 may use it to traverse such security devices and connect to tunneling server 116 to reach servers 124 in service provider network 122.

The TSCF standard further provides control messages for exchanging configuration information between tunneling client 106 and tunneling server 116. According to the TSCF standard, control messages are of a "request/response" type, and a control message response for a request includes either a corresponding reply or an error code indicating why the request cannot be honored by the receiving end. TSCF control messages use a Type Length Value ("TLV") encoding. TLV is a variable length concatenation of a unique type and a corresponding value.

Each TSCF control message includes a control message header at the beginning, including a "CM_Version" field identifying the version of the header and indicating the outer transport protocol of a TSCF tunnel, a "CM_Indication" field identifying whether the message is a control message or not, a "Reserved" field reserved for future use, a "CM_Type" field identifying the type of the control message (e.g., whether it is a request or a response, the corresponding functionality, etc.), a "TLV_Count" field indicating the number of TLVs that follow or are appended to the header in the corresponding control message, a "Tunnel Session ID" ("TSID") field including a tunnel session identifier ("ID") assigned by tunneling server 116 to uniquely identify TSCF tunnel 108, and a "Sequence" field that is incremented per message, as described in, for example, 3GPP TR 33.830 V0.5.0.

In one embodiment, in order to establish TSCF tunnel 108, tunneling client 106 sends a "configuration request" message to tunneling server 116 to obtain configuration information for TSCF tunnel 108. In a "configuration request" message, the TSID header field bits are set to 1 (i.e., FFFF . . . ). In response, tunneling server 116 assigns a TSID to a TSCF tunnel and sends a "configuration response" message back to tunneling client 106. The "configuration response" message includes the TSID assigned by tunneling server 116 to TSCF tunnel 108. The subsequent messages between tunneling client 106 and tunneling server 116 include this assigned TSID in their headers.

In one embodiment, if a control message is communicated between tunneling client 106 and tunneling server 116 and does not include the expected TSID, the control message is dropped and the corresponding TSCF tunnel is terminated. Alternatively, in one embodiment, tunneling client 106 may send a "configuration release request" message to tunneling server 116 to terminate a TSCF tunnel. In response to such a "configuration release request" message, tunneling server 116 sends a "configuration release response" message to tunneling client 106. At this time, TSCF tunnel 108 is terminated.

In one embodiment, UE 102 executes an application 104 that may be a SIP-based RTC application relying on a library such as the software development kit ("SDK") provided by the tunneled session management solution from Oracle Corporation.

Figure 2:
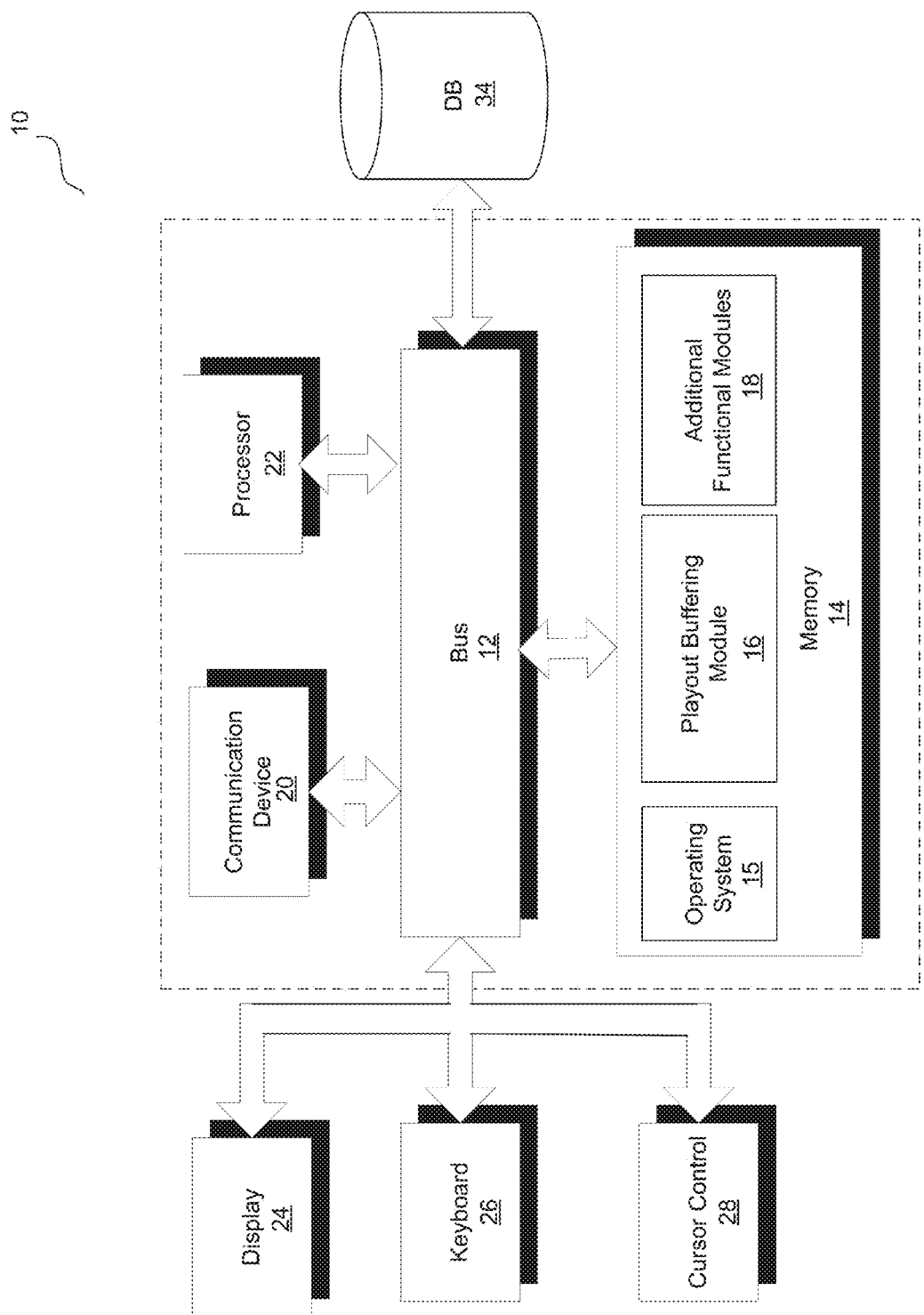
FIG. 2 illustrates a block diagram of a system that can implement an embodiment of the invention.

FIG. 2 illustrates a block diagram of a system 10 that can implement one embodiment of the invention. System 10 can be used to implement any of the network elements shown in FIG. 1 as necessary in order to implement any of the functionality of embodiments of the invention disclosed in detail below. Although shown as a single system, the functionality of system 10 can be implemented as a distributed system. Further, the functionality disclosed herein can be implemented on separate servers or devices that may be coupled together over a network. Further, one or more components of system 10 may not be included. For example, for the functionality of tunneling client 106 of FIG. 1 or tunneling server 116 of FIG. 1, system 10 may be a client or server that does not include a display 24 or one or more other components shown in FIG. 2.

According to the embodiment, system 10 includes a bus 12 or other communications mechanism for communicating information between components of system 10. System 10 also includes a processor 22, operatively coupled to bus 12, for processing information and executing instructions or operations. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. System 10 further includes a communication device 20, such as a network interface card or other communications interface, to provide access to a network. As a result, a user may interface with system 10 directly, or remotely through a network or any other method.

A computer-readable medium may be any available medium that can be accessed by processor 22. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with system 10.

According to one embodiment, memory 14 can store software modules that may provide functionality when executed by processor 22. The modules can include an operating system 15, a playout buffering module 16, as well as other functional modules 18. Operating system 15 can provide an operating system functionality for system 10. Playout buffering module 16 can provide functionality for providing playout buffering, and all other disclosed functionality, as further disclosed below. In certain embodiments, playout buffering module 16 can comprise a plurality of modules, where each module provides specific individual functionality for providing playout buffering and all other disclosed functionality. In one example embodiment, playout buffering module 16 may implement tunneling client 106 of FIG. 1 in conjunction with one or more remaining elements of FIG. 2. System 10 can also be part of a larger system. Thus, system 10 can include one or more additional functional modules 18 to include the additional functionality. For example, functional modules 18 may include modules that provide additional functionality, such as functionality of an "Acme Packet 4500" product by Oracle Corporation.

Processor 22 can also be operatively coupled via bus 12 to a database 34. Database 34 can store data in an integrated collection of logically-related records or files. Database 34 can be an operational database, an analytical database, a data warehouse, a distributed database, an end-user database, an external database, a navigational database, an in-memory database, a document-oriented database, a real-time database, a relational database, an object-oriented database, or any other database known in the art.

Referring to FIG. 1, with known systems, a tunneling client (such as tunneling client 106), can include a tunneling client SDK that provides a Berkeley software distribution ("BSD")-like socket API that can be used to send and receive encapsulated media using the tsc_sendto and tsc_recvfrom functions, respectively. Speech, or another type of audio, is typically transmitted as encoded 160-sample frames every 20 milliseconds. Video, on the other hand, is typically transmitted as 15 encoded pictures per second. For smooth playback, both speech and video typically have to be received at a same constant interval at which they were sent. However, impairments like packet loss and latency can cause significant speech and video playback degradation and choppiness. These problems were typically addressed by incorporating application layer buffering, where a client application that performed playback of the speech and video data would implement buffering of the speech and video data before playback. In a non-tunneled environment, a client application is typically required to include a jitter buffer that is applied to traffic after the BSD recvfrom API is invoked in order to minimize the effect of these impairments. However, this is not a practical solution to speech and video playback degradation and choppiness because a client application typically does not have full visibility of overall traffic patterns, and because a client application is typically not fully aware of speech and video synchronization.

In contrast to previous systems, embodiments of the present invention address the transport problem previously described directly in the transport layer, in the context of a tunneling architecture, without involving a client application. In other words, a tunneling client (such as tunneling client 106 of FIG. 1) can provide buffering and synchronization of encapsulated media, such as speech and video, before the encapsulated media is removed from a tunnel using a tsc_recvform function, which can eliminate a need of an external jitter buffer. This can be possible because the tunneling client SDK can control access to tunneled speech and video packets, providing not only buffering but also synchronization. In some embodiments, the tunneling client can implement this transport layer buffering in conjunction with application layer buffering performed by a client application. However, in alternate embodiments, this transport layer buffering performed by the tunneling client can replace application layer buffering performed by a client application, so that any client application that removes encapsulated media from the tunnel using the tsc_revform function is not required to perform any application layer buffering.

According to an embodiment, a tunneling client can insert a playout buffer at a transport layer right before a queue that interfaces with a client application via one or more TSCF inner socket application programming interfaces ("APIs"). A network socket is an endpoint of an inter-process communication flow across a computer network according to a communications protocol. A network socket may be a datagram socket (a connectionless network socket) or a stream socket (a connection-oriented and sequenced socket). In general, for regular communications, a user can create a datagram or stream socket that uses the network interface of the system in which the application runs. In a TSCF environment, however, sockets use a tunnel for transport instead of a network interface. To differentiate these sockets from regular sockets, they are referred to as "inner sockets" since they only exist inside a tunnel. That is, an inner socket only exists in association with a tunnel and socket traffic gets transported by the tunnel. Further, based on measured network latency and packet loss of encapsulated traffic, the tunneling client selects a buffering depth for the playout buffer, where a buffering depth is a number of packets that can be buffered before the encapsulated traffic is released to the client application. A buffering depth can also be identified as a playout buffer threshold. Further, in one embodiment, when both speech and video are to be synchronized, the tunneling client can implement multiple playout buffers in pairs, which can synchronize the buffered speech and video data, and thus, delivering improved media quality.

One embodiment provides playout buffering functionality by implementing a playout buffering module 118 at tunneling client 106 of FIG. 1. In one embodiment, as described below in greater detail, playout buffering module 118 creates one or more playout buffers, where each playout buffer corresponds to an inner socket queue. Further, for each playout buffer, playout buffering module 118 defines a buffering depth, where a buffering depth defines a number of packets that the corresponding playout buffer buffers before the packets are released to a client application. A buffering depth can also be identified as a playout buffer threshold. Even further, in one embodiment, playout buffering module 118 can implement a plurality of playout buffers in pairs to synchronize packets containing speech data and packets containing video data.

Figure 3:
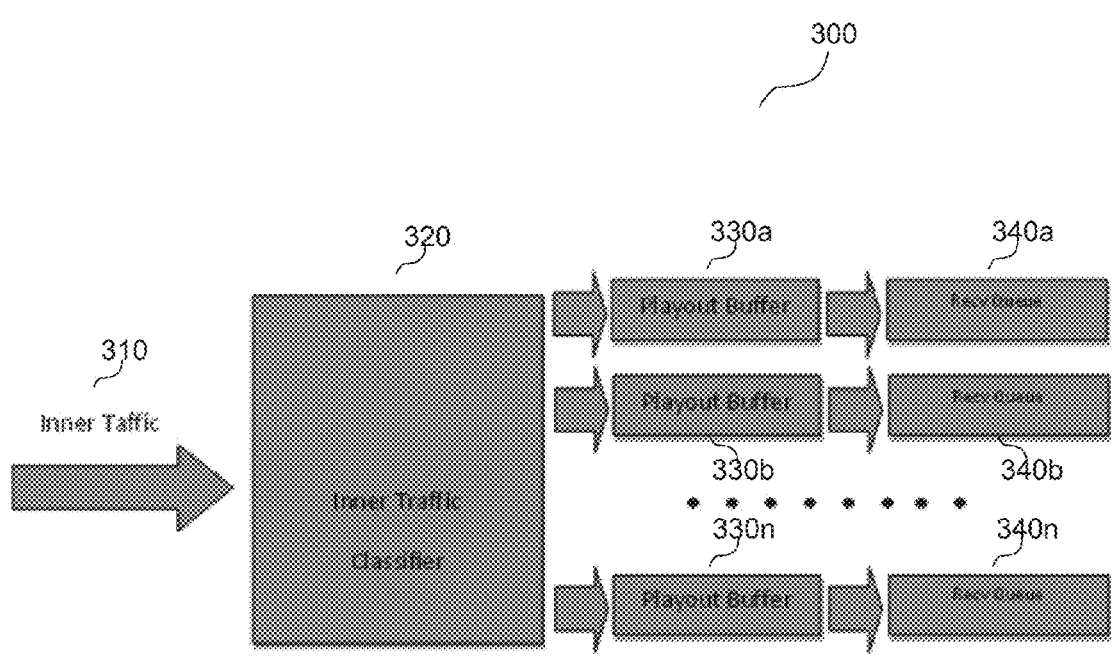
FIG. 3 illustrates example playout buffers in an inner socket tunnel configuration, according to an embodiment of the invention.

FIG. 3 illustrates example playout buffers in an inner socket tunnel configuration, according to an embodiment of the invention. As one of ordinary skill in the art would readily appreciate, "inner traffic" is traffic associated with an inner socket tunnel, such as a TSCF tunnel. According to an embodiment, inner traffic 310, when first received by a tunneling client (such as tunneling client 106 of FIG. 1), can be classified by inner traffic classifier 320 depending on its source and destination network and transport addresses, and can further be routed by inner traffic classifier 320 to a receiving queue of a corresponding inner socket (i.e., one of receiving queues 340*a*, 340*b*, . . . 340*n*), where inner traffic can be accessed by a client application using the tsc_recvfrom API. In accordance with the embodiment, the tunneling client can place one or more playout buffers (i.e., playout buffers 330*a*, 330*b*, . . . 330*n*) between inner traffic classifier 320 and one or more receiving queues (i.e., receiving queues 340*a*, 340*b*, . . . 340*n*), such that media packets can be received in the one or more receiving queues at a frequency that can increase the smoothness of a playback, and can minimize a choppiness caused by network latency and packet loss.

According to the embodiment, playout buffers 330*a*, 330*b*, . . . 330*n* act as state machines with two states: (1)

buffering; and (2) playing. By default, a playout buffer is in a buffering state where classified packets are accumulated and stored. Only when a number of stored packets is above a pre-defined number or level, also identified as a buffering depth or playout buffer threshold, the playout buffer switches to a playing state. In the playing state, not only are inner packets transferred from inner traffic classifier 320 to a playout buffer (i.e., one of playout buffers 330*a*, 330*b*, . . . 330*n*), but the buffered packets are also transferred to a receiving queue of a corresponding inner socket (i.e., one of receiving queues 340*a*, 340*b*, . . . 340*n*) according to the buffered packets' media timestamps. Because this scheme controls buffering at a socket level, rather than at an application level, it is possible to facilitate speech and video synchronization by transferring packets from playout buffers (i.e., playout buffers 330*a*, 330*b*, . . . 330*n*) to corresponding receiving queues (i.e., receiving queues 340*a*, 340*b*, . . . 340*n*) whenever the available media packets are synchronized in pairs.

The following pseudo-code describes the playout buffer functionality, according to an example embodiment of the invention:

```
init:
    state = buffering
    queue.clear( )
    buffer.clear( );
end
in_packet(pkt):
    buffer.push(pkt)
    if state == buffering AND buffer.size( ) > THRESHOLD then
        state = playing
    end
end
timer:
    if state == playing then
        if buffer.size( ) == 0 then
            state = buffering
```

According to the embodiment, the init function can be used to initialize the state machine. Whenever a packet pkt is available it can be processed by calling the in_packet function. In order to transfer packets from a playout buffer to a queue, the timer function must be periodically called.

Thus, in accordance with an embodiment, a tunneling client (such as tunneling client 106 of FIG. 1) can store inner datagram frames using one or more playout buffers before releasing them to an application via the tsc_revfrom API.

In one embodiment, in order to enable a playout buffer on a specific socket, an appropriate socket option can be set. The following pseudo-code can be used to set an appropriate socket option, according to an example embodiment of the invention:

```
int playout_buffer_level = 5;
int result = tsc_setsockopt(rtp_socket, SOL_SOCKET,
    SO_TSC_TUNNEL_PLAYOUT_BUFFER,
    (char *)&playout_buffer_level, sizeof(int));
```

Thus, in accordance with an embodiment, a tunneling client (such as tunneling client 106 of FIG. 1) can configure the one or more playout buffers on an inner socket basis via a tsc_setsocketopt API.

According to the embodiment, playout_buffer_level can be used to indicate a playout buffer threshold (e.g., a pre-defined number of packets) for which a playout buffer switches from a buffering state to a playing state. Deciding what value to use as a value for playout_buffer_level can be a trade-off since an objective is to assign a smallest possible value of playout_buffer_level that masks an overall network latency without incurring choppiness. To disable playout buffering, playout_buffer_level can be set to a value of 0. If playout_buffer_level is a value of −1, the playout buffer threshold can be set dynamically according to a packet latency measured in a tunnel. Whenever the option is set correctly, tsc_setsockopt returns a value of 0.

The following pseudo-code shows how a notification is enabled as well as its callback prototype, according to an example embodiment of the invention:

```
tsc_notification_enable(handle, tsc_notification_playback_buffer,
playback_buffer_notification, NULL);
    void playback_buffer_notification(tsc_notification_data
    *notification)
    {
        tsc_notification_playback_buffer_info_data
*playback_buffer_data = (tsc_notification_playback_buffer_
info_data *)notification->data;
        if (playback_buffer_data &&
        playback_buffer_data->available == tsc_bool_true) {
            if (playback_buffer_data->enabled == tsc_bool_true) {
                printf("playback buffer notification playing enabled
on socket %d\n", playback_buffer_data->socket);
            } else {
                printf("playback buffer notification playing disabled
on socket %d\n", playback_buffer_data->socket);
            }
        } else {
            printf("playback buffer notification not allowed on socket
%d\n", playback_buffer_data->socket);
        }
}
```

The fourth NULL parameter in tsc_notification_enable is an opaque/private data pointer that can be recovered in the tsc_notification_data structure upon callback.

Thus, in one embodiment, a tunneling client (such as tunneling client 106 of FIG. 1) can notify an application of a state of the one or more playout buffers via a tsc_notification_enable API.

Figure 4:
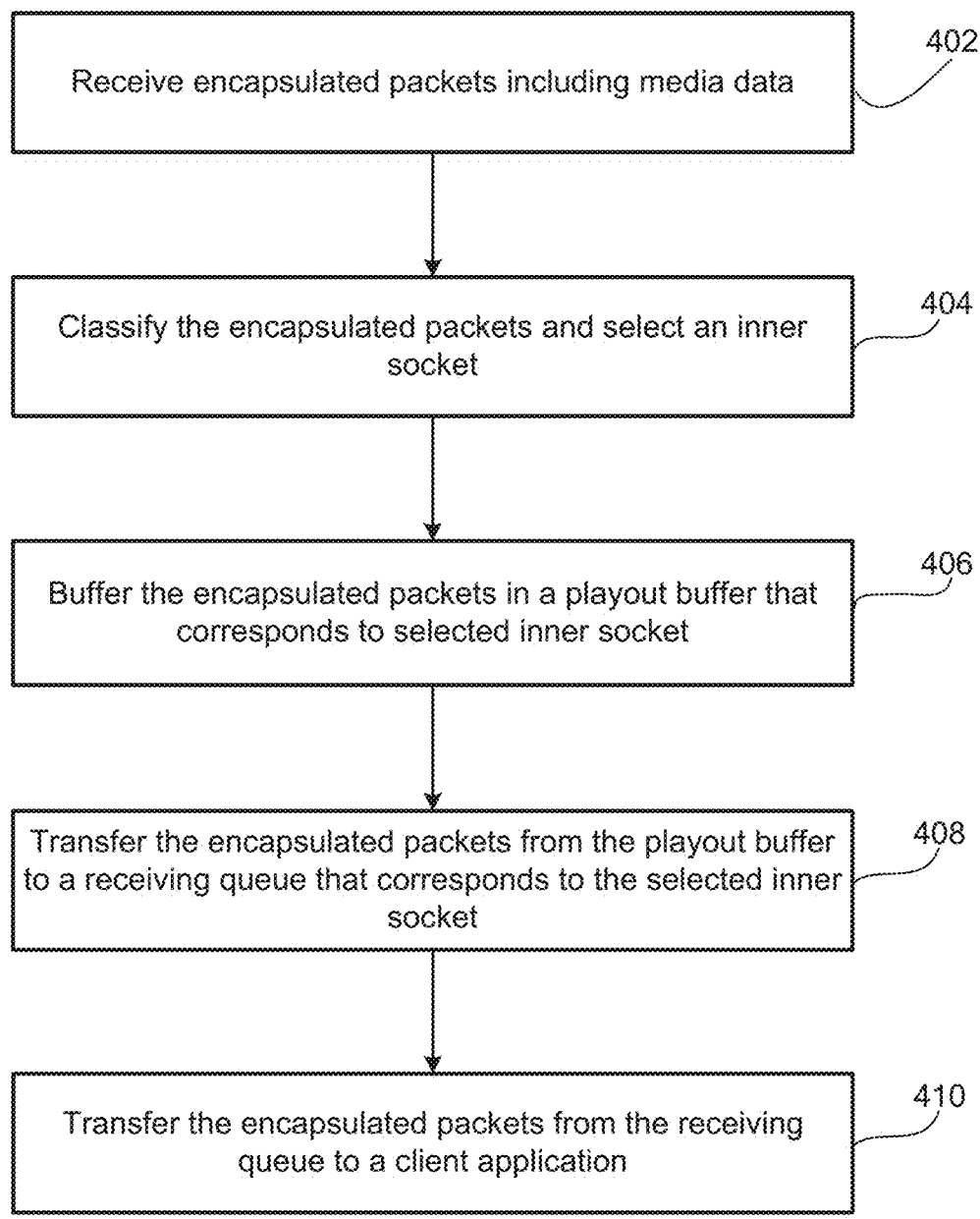
FIG. 4 illustrates a flow diagram of the functionality of a playout buffering module, according to an embodiment of the invention.

FIG. 4 illustrates a flow diagram of the functionality of a playout buffering module (such as playout buffering module 118 of FIG. 1 or playout buffering module 16 of FIG. 2), according to an embodiment of the invention. In one embodiment, the functionality of the flow diagram of FIG. 4 is implemented by software stored in a memory or some other computer-readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software. In certain embodiments, some of the functionality can be omitted.

The flow begins and proceeds to 402. At 402, one or more packets including media data are received from a tunneling server by a tunneling client via a tunnel. In certain embodiments, the one or more packets are encapsulated packets. Further, in some of these embodiments, the encapsulated packets include a first encapsulated packet that includes audio data, such as speech data, and a second encapsulated packet that includes video data. Further, in certain embodiments, the tunnel is a TSCF tunnel. The flow then proceeds to 404.

At 404, the one or more packets are classified and an inner socket is selected from a plurality of inner sockets based on a classification of the one or more packets. In certain embodiments, the one or more packets are classified based on their source and destination network and transport addresses. The flow then proceeds to 406.

At 406, the one or more packets are buffered in one or more playout buffers that correspond to the selected inner socket. In certain embodiments where the one or more packets include a first packet that includes audio data and a second packet that includes video data, the first packet is buffered in a first playout buffer and the second packet is buffered in a second playout buffer. Further, in certain embodiments, the one or more playout buffers are located at a transport level. The flow then proceeds to 408.

At 408, the one or more packets are transferred from the playout buffer to a receiving queue that corresponds to the selected inner socket when a number of the one or more packets exceeds a playout buffer threshold. In certain embodiments, the playout buffer is enabled for the selected inner socket, the playout buffer threshold is defined, and a notification that the playout buffer has been enabled is sent to a client application. In some of these embodiments, the playout buffer threshold is dynamically defined according to a packet latency measured in the tunnel. Further, in certain embodiments where the one or more packets include a first packet that includes audio data and a second packet that includes video data, the first packet is transferred from the first playout buffer to the receiving queue and the second packet is transferred from the second playout buffer to the receiving queue. In these embodiments, a transfer of the first packet from the first playout buffer to the receiving queue and the transfer of the second packet from the second playout buffer to the receiving queue collectively synchronize an output of the audio data and the video data by a client application.

Further, in certain embodiments, a playout buffer is a state machine with a buffering state and a playing state. In these embodiments, the playout buffer is first in a buffering state when the one or more packets are stored. The playout buffer then switches from the buffering state to the playing state when the number of the one or more packets exceeds the playout buffer threshold. The playout buffer then switches from the playing state to the buffering state when the one or more packets have been transferred from the playout buffer to the receiving queue. The flow then proceeds to 410.

At 410, the one or more packets are released from the receiving queue to a client application. The flow then ends.

Thus, in one embodiment, a tunneling client buffers encapsulated packets using a playout buffer that is integrated within a transport level of a tunneling environment. The tunneling client can then perform the buffering of received packets, and thus, any corresponding client application that receives the packets from the tunneling client is not required to perform buffering. This can improve the functionality of both a tunneling client and a client application, by allowing the client application to read media packets directly out of a tunnel from the tunneling client in a way that minimizes content degradation and choppiness while maximizing speech and video synchronization.

The features, structures, or characteristics of the invention described throughout this specification may be combined in any suitable manner in one or more embodiments. For example, the usage of "one embodiment", "some embodiments", "certain embodiment", "certain embodiments", or other similar language, throughout this specification refers to the fact that a particular feature, structure, or characteristic described in connection with the embodiment may be included in at least one embodiment of the present invention. Thus, appearances of the phrases "one embodiment", "some embodiments", "a certain embodiment", "certain embodiments", or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:

1. A non-transitory computer-readable medium having instructions stored thereon that, when executed by a processor, cause the processor to perform playout buffering functionality for encapsulated media, the playout buffering functionality comprising:
   receiving, by a tunneling client, one or more packets comprising media data from a tunneling server via a tunnel, wherein the tunnel comprises a plurality of inner sockets;
   selecting, based on a classification of the one or more packets, an inner socket from the plurality of inner sockets;
   buffering the one or more packets in a playout buffer that corresponds to the selected inner socket;
   transferring the one or more packets from the playout buffer to a receiving queue that corresponds to the selected inner socket when a number of the one or more packets exceeds a playout buffer threshold; and
   releasing the one or more packets from the receiving queue to a client application.

2. The computer-readable medium of claim 1, wherein the buffering the one or more packets in the playout buffer further comprises:
   buffering a first packet in a first playout buffer, the first packet comprising audio data; and
   buffering a second packet in a second playout buffer, the second packet comprising video data.

3. The computer-readable medium of claim 2, wherein the transferring the one or more packets from the playout buffer to the receiving queue further comprises:
   transferring the first packet from the first playout buffer to the receiving queue; and
   transferring the second packet from the second playout buffer to the receiving queue;
   wherein a transfer of the first packet from the first playout buffer to the receiving queue and the transfer of the second packet from the second playout buffer to the receiving queue collectively synchronize an output of the audio data and the video data by the client application.

4. The computer-readable medium of claim 1, the playout buffering functionality further comprising:
   enabling the playout buffer for the selected inner socket;
   wherein the classifying is based on a source address, a destination address and a transport address.

5. The computer-readable medium of claim 4, the playout buffering functionality further comprising:
   defining the playout buffer threshold.

6. The computer-readable medium of claim 5, wherein the defining the playout buffer threshold further comprises dynamically defining the playout buffer threshold according to a packet latency measured in the tunnel.

7. The computer-readable medium of claim 5, the playout buffering functionality further comprising:
sending a notification that the playout buffer has been enabled to the client application.

8. The computer-readable medium of claim 1,
wherein the playout buffer comprises a state machine with a buffering state and a playing state;
wherein the playout buffer is first in the buffering state where the one or more packets are stored;
wherein the playout buffer switches from the buffering state to the playing state when the number of the one or more packets exceeds the playout buffer threshold; and
wherein the playout buffer switches from the playing state to the buffering state when the one or more packets have been transferred from the playout buffer to the receiving queue.

9. The computer-readable medium of claim 1, wherein the one or more playout buffers are located at a transport level.

10. The computer-readable medium of claim 1, wherein the tunnel comprises a tunneled services control function tunnel.

11. A computer-implemented method for performing playout buffering functionality for encapsulated media, the computer-implemented method comprising:
receiving, by a tunneling client, one or more packets comprising media data from a tunneling server via a tunnel, wherein the tunnel comprises a plurality of inner sockets;
selecting, based on a classification of the one or more packets, an inner socket from a plurality of inner sockets;
buffering the one or more packets in a playout buffer that corresponds to the selected inner socket;
transferring the one or more packets from the playout buffer to a receiving queue that corresponds to the selected inner socket when a number of the one or more packets exceeds a playout buffer threshold; and
releasing the one or more packets from the receiving queue to a client application.

12. The computer-implemented method of claim 11, wherein the buffering the one or more packets in the playout buffer further comprises:
buffering a first packet in a first playout buffer, the first packet comprising audio data; and
buffering a second packet in a second playout buffer, the second packet comprising video data.

13. The computer-implemented method of claim 12, wherein the transferring the one or more packets from the playout buffer to the receiving queue further comprises:
transferring the first packet from the first playout buffer to the receiving queue; and
transferring the second packet from the second playout buffer to the receiving queue;
wherein a transfer of the first packet from the first playout buffer to the receiving queue and the transfer of the second packet from the second playout buffer to the receiving queue collectively synchronize an output of the audio data and the video data by the client application.

14. The computer-implemented method of claim 11, further comprising:
enabling the playout buffer for the selected inner socket;
defining the playout buffer threshold; and
sending a notification that the playout buffer has been enabled to the client application.

15. The computer-implemented method of claim 11,
wherein the playout buffer comprises a state machine with a buffering state and a playing state;
wherein the playout buffer is first in the buffering state where the one or more packets are stored;
wherein the playout buffer switches from the buffering state to the playing state when the number of the one or more packets exceeds the playout buffer threshold; and
wherein the playout buffer switches from the playing state to the buffering state when the one or more packets have been transferred from the playout buffer to the receiving queue.

16. A system for performing playout buffering functionality for encapsulated media, the system comprising:
a processor;
a playout buffering module;
wherein the playout buffering module, when executed by the processor, is configured to receive one or more packets comprising media data from a tunneling server via a tunnel, wherein the tunnel comprises a plurality of inner sockets;
wherein the playout buffering module, when executed by the processor, is further configured to select, based on a classification of the one or more packets, an inner socket from a plurality of inner sockets;
wherein the playout buffering module, when executed by the processor, is further configured to buffer the one or more packets in a playout buffer that corresponds to the selected inner socket;
wherein the playout buffering module, when executed by the processor, is further configured to transfer the one or more packets from the playout buffer to a receiving queue that corresponds to the selected inner socket when a number of the one or more packets exceeds a playout buffer threshold; and
wherein the playout buffering module, when executed by the processor, is further configured to release the one or more packets from the receiving queue to a client application.

17. The system of claim 16,
wherein the playout buffering module, when executed by the processor, is further configured to buffer a first packet in a first playout buffer, the first packet comprising audio data; and
wherein the playout buffering module, when executed by the processor, is further configured to buffer a second packet in a second playout buffer, the second packet comprising video data.

18. The system of claim 17,
wherein the playout buffering module, when executed by the processor, is further configured to transfer the first packet from the first playout buffer to the receiving queue;
wherein the playout buffering module, when executed by the processor, is further configured to transfer the second packet from the second playout buffer to the receiving queue; and
wherein a transfer of the first packet from the first playout buffer to the receiving queue and the transfer of the second packet from the second playout buffer to the receiving queue collectively synchronize an output of the audio data and the video data by the client application.

19. The system of claim 16,
wherein the playout buffering module, when executed by the processor, is further configured to enable the playout buffer for the selected inner socket;
wherein the playout buffering module, when executed by the processor, is further configured to define the playout buffer threshold; and
wherein the playout buffering module, when executed by the processor, is further configured to send a notification that the playout buffer has been enabled to the client application.

20. The system of claim 16,
wherein the playout buffer comprises a state machine with a buffering state and a playing state;
wherein the playout buffer is first in the buffering state where the one or more packets are stored;
wherein the playout buffer switches from the buffering state to the playing state when the number of the one or more packets exceeds the playout buffer threshold; and
wherein the playout buffer switches from the playing state to the buffering state when the one or more packets have been transferred from the playout buffer to the receiving queue.

\* \* \* \* \*